US005275677A

United States Patent [19]

Morley

[11] Patent Number: 5,275,677
[45] Date of Patent: Jan. 4, 1994

[54] SEPARATOR OF CORRUGATED PAPER AND METHOD

[75] Inventor: Timothy C. Morley, Birmingham, England

[73] Assignee: Aston Packaging Limited, Birmingham, England

[21] Appl. No.: 732,830

[22] Filed: Jul. 19, 1991

[51] Int. Cl.[5] .................... B32B 31/20
[52] U.S. Cl. .................... 156/196; 156/198; 156/207; 156/209; 156/443; 156/469; 156/474; 206/586
[58] Field of Search .................... 156/196, 198, 207, 209, 156/443, 469, 474; 206/453, 521, 586, 593; 217/53; 229/120.08, 120.22, 120.29, DIG.; 220/500, DIG.; 493/904

[56] References Cited

U.S. PATENT DOCUMENTS

| | | | |
|---|---|---|---|
| 3,049,260 | 8/1962 | Stone | 206/586 |
| 3,244,347 | 4/1966 | Jenk | 206/586 |
| 3,624,791 | 1/1970 | Taub | 221/59 |
| 4,399,915 | 8/1983 | Sorenson | 206/586 |
| 4,771,893 | 9/1988 | Liebel | 206/586 |

FOREIGN PATENT DOCUMENTS

| | | | |
|---|---|---|---|
| 663888 | 12/1951 | United Kingdom | 18/96 |
| 964153 | 7/1964 | United Kingdom | |
| 2080767 | 2/1982 | United Kingdom | 206/586 |
| 2246765 | 2/1992 | United Kingdom | 206/586 |

*Primary Examiner*—Caleb Weston
*Attorney, Agent, or Firm*—Oblon, Spivak, McClelland, Maier & Neustadt

[57] ABSTRACT

A separator of T-section made from a unitary roll of single faced corrugated paper, and a method and machine therefore.

3 Claims, 2 Drawing Sheets

SEPARATOR OF CORRUGATED PAPER AND METHOD

This invention relates to a separator of corrugated paper and method.

BACKGROUND OF THE INVENTION

Items are frequently despatched in matched groups in a common container. The items need to be packaged so that they will not be damaged in transit, and for such "matched group" items in particular often there is the complementary requirement that the items be kept spaced apart. This requirement of protection against damage whether arising from impacts "external" to the container or from self-impacts "internal" to the container applies particularly to the despatch of rigid items with sharp side edges, for instance matched pairs of hi-fi or stereo speakers.

It is known to single package sharp-edged units, spaced apart, using one of the oil-derived packaging materials; but these various materials are individually not highly favoured for one or more reasons i.e. since they may themselves be easily crushed by impacts they may only provide one-impact protection; they may not have the requisite impact strength and so may shear or fracture, again with only one fully effective impact-protection; they are expensive to make in small quantities, and in consequence are often only sold in substantial volumes, greater than that normally required by many manufacturers wishing to despatch their matching units in a single package or container; they are not generally available for just-in-time customers, but only with a long lead or order time.

An alternative packaging material which has been used is a length of L-section multi-layer corrugated paper ("L-pad"), placed back-to-back with a similar section; this material has the advantage that it can provide cushioned protection for square-cornered items, even after several impacts, and the advantage that it is strong in shear and so can be load bearing, for instance if the packages are stacked one on top of another during transit or in the warehouse. However, the material has traditionally been made from several layers of corrugated paper, so that when the L-sections are placed back-to-back the articles are often more widely spaced apart than desired, adding to packaging costs and container size. Also the placement of the sections back-to back and their retention in that condition whilst the items are being assembled in the container can require considerable skill.

SUMMARY OF THE INVENTION

We now propose a separator of corrugated paper, characterised in that the separator is of T-section.

We also propose a method of manufacturing such a separator which includes the steps of locating a unitary roll of single faced corrugated paper, squeezing the located roll between jaws to form a first part and a second part, and holding the roll squeezed between the jaws until the first and second parts adopt a stable configuration. The first separator part will have substantially parallel side walls, as will the second separator part, the said parts being substantially perpendicular and with the first part intersecting, preferably bisecting, the second part. Thus the method includes forming a predetermined length of single faced corrugated paper into a roll, squeezing one portion of the roll to form a first substantially parallel-sided part, and pressing the remainder of the roll towards the first part to form a second substantially parallel-sided part, the first part intersecting the second part to form a separator of T-section.

Preferably the corrugated paper is single-faced so as to be bendable parallel to the corrugations, and will have the exposed edges of the corrugations painted with adhesive so that the roll remains stable pending forming into the T-section separator. A length of corrugated paper will typically be cut sufficient to provide when rolled and formed a T-section separator of the desired size and thickness. Conveniently the adhesive will be cold-curable during the forming of the T-section separator.

Usefully, as indicated above, the first part bisects the second part so that the T-stem provided by the first part is centrally located relative to the T-head provided by the second part, but in an alternative embodiment the first part is offset so that the overhang of the second part is different to either side.

The invention also includes a machine for manufacturing a disclosed separator, and a package containing two articles or items kept apart by a pair of the disclosed separators.

DETAILED DESCRIPTION OF THE INVENTION

The invention is further described by way of example with reference to the accompanying schematic drawings in which:

FIG. 1 shows a roll 2 of a selected length of single-faced corrugated paper, produced by a known process utilising adhesive painted on the ridges of the corrugations.

Figure 1:
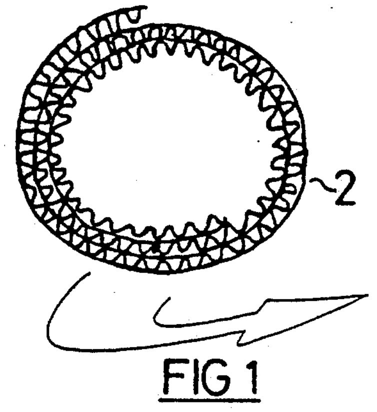
FIG. 1 is an end section of a roll of single-faced corrugated paper produced by a known process.
Figure 2:
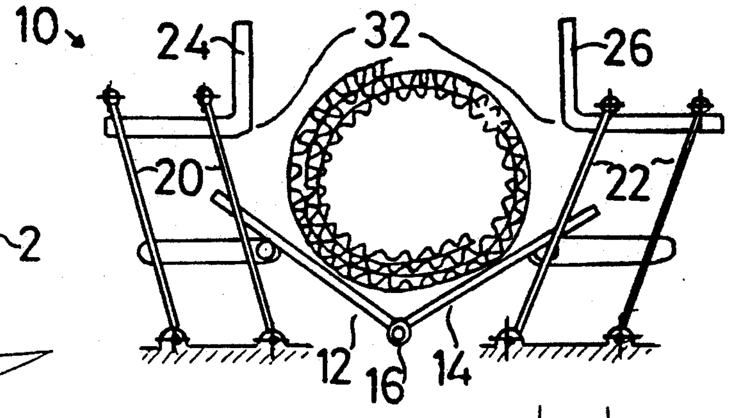
FIG. 2 is a end section of the roll of paper of FIG. 1 placed in one embodiment of separator forming machine.

In FIG. 2, the illustrative roll of paper 2 of FIG. 1 has been placed in a first embodiment of separator-forming machine 10. Machine 10 includes two plates 12, 14 pivoted at 16 and shown in the rest or start condition with but a shallow V-form, in this embodiment with an included angle of 110 degrees.

Mounted on parallelogram structures 20, 22 are respective pressure members or anvils 24, 26; as viewed in FIG. 2 each pressure member has respectively an upwardly directed section *24a*, *26a*, and a horizontal section *24b*, *26b*. The parallelogram structures are operable to move the pressure members 24, 26 one towards the other. In a preferred embodiment there is a fixed stop (not shown) which limits the inward or approach movement of the pressure members.

Figure 3:
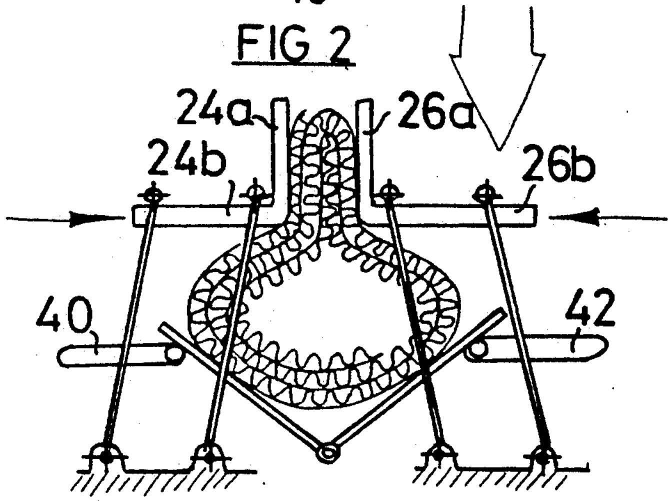
FIG. 3 is the first operational stage of the separator forming machine of FIG. 2.
Figure 6:
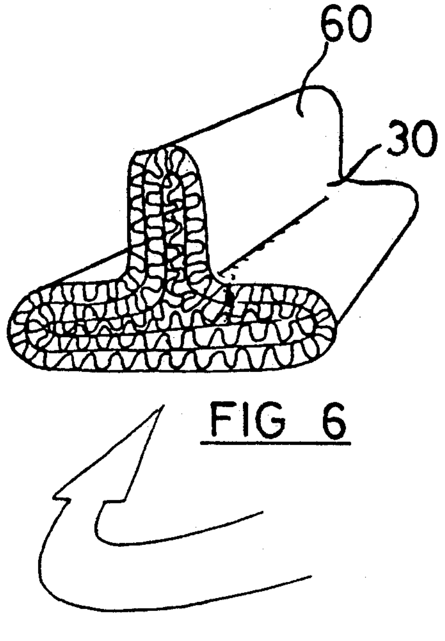
FIG. 6 is of a formed separator.

In use, the pressure members are driven inwardly one towards the other as seen in FIG. 3, to first pinch and then squeeze or force together between sections *24a*, *26a* an upper portion of the roll 2, to form a first substantially parallel-sided part. Thereafter, as indicated in FIG. 4, the pivot 16 is driven upwardly by a force F until the plates 12, 14 are substantially horizontal, to sandwich, squeeze and flatten the remainder of the roll 2 between the plates 12, 14 and the horizontal sections 24*b*, 26*b* of the pressure members; thus a second substantially parallel-sided part is formed, and there is effected a defined change of angle at junction 30 (FIG. 6) between the first and second parts.

Figure 4:
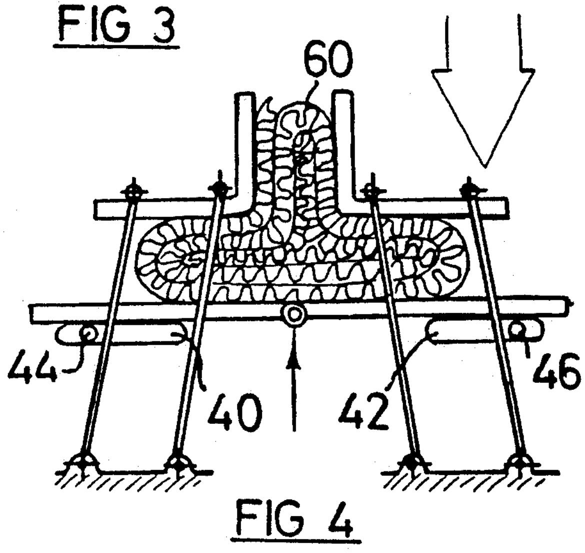
FIG. 4 is the second operational stage of the separator forming machine of FIG. 2.

The separator is held in the machine in the position shown in FIG. 4 until the adhesive has been cold cured, to ensure that the separator 60 (FIG. 6) remains in the formed section when removed from the machine i.e. that the formed section is stable. A timer, preferably adjustable and lockable, can prevent inadvertent early removal of the separator from the machine i.e. before its stable configuration is assured.

The separator 60 is of 4-ply, and can provide effective cushioning as well as end-loading strength; an advantage of this embodiment is that because of the two stage forming of separator 60, the junction 30 is very clearly defined, being partly formed at the stage as indicated in FIG. 3, and then finished at the stage as indicated in FIG. 4.

In an alternative embodiment, the inward stop (not shown) for the sections 24*a*, 24*b* can be adjusted to cope with the various required thicknesses of separator i.e. a six-ply or an eight-ply pad, obtained as above mentioned from suitable rolls formed from pre-set lengths of single-faced corrugated paper wound with the required number of turns on a mandrel; if the parallelogram structures 20, 22 are not suited to these alternative pad thicknesses, then these also can be replaced, for instance by embodiments with longer arms, or arms mounted more widely on the machine.

When the plates 12, 14 are pivoted to increase the included angle by upward force F, a pair of studs 44, 46 at each end of the respective plates 12, 14 slide in slots 40, 42 in fixed end members of the machine, whereby the plates 12, 14 are kept at a pre-set height. In an alternative embodiment, studs 44, 46 are replaced by a pair of elongate rods mounted to the underside of the respective plate.

If required, the machine can make separators with an offset shank i.e offset first part. Thus instead of the roll 2 being allowed to rest in a central position in the V-groove, it is held offset (as by a pivoted lever, not shown) until the roll 2 is squeezed between the sections 24*a*, 26*a*, whereafter the lever is pivoted away prior to the stage of FIG. 4, as by engagement of a cam follower mounted on the pivoted lever by a cam carried by one of arms 12.14.

An advantage of the finished separator 60 is that it is of a stable configuration, and thus can be sawn to appropriate lengths without effectively being damaged; the machine of FIGS. 2–4 can thus be of a size to produce initial lengths of separator according to the invention greater than usually needed by individual customers, perhaps of 2–3 meters or even more. Thus the finished separator is not necessarily or indeed often made to length, being readily cut to the length required by different customers, but it is made to the required ply e.g. 4-ply, 6-ply, again readily and simply by the choice of the appropriate corrugated paper starter roll. Thus the manufacturing method, and the disclosed machine, allows great flexibility in the provision of various lengths and thicknesses of finished separator.

Figure 5:
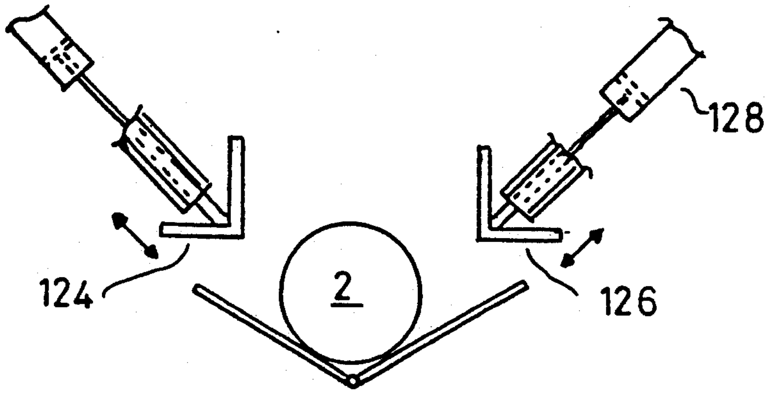
FIG. 5 is of an alternative separator forming machine.
Figure 7:
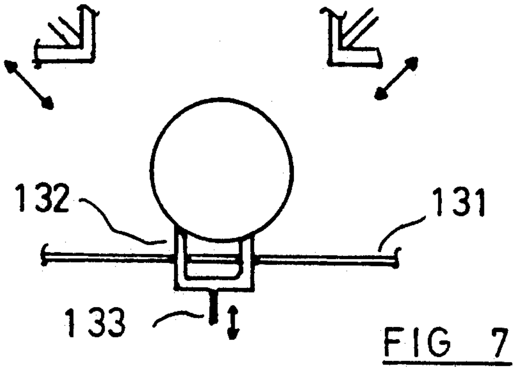
FIG. 7 is of a further alternative separator forming machine.

In the embodiment of FIG. 5, we propose a single step forming operation wherein the pressure members 124, 126 are brought into the roll 2 at a convenient angle, usually 27 degrees. The roll 2 can be held in position either by a shallow V-groove as above described, or by a pair of location arms also as above described (but not shown). In the embodiment of FIG. 7 the roll 2 is held by retractable location pins 132 which extend through a flat machine table 131, the pins being retractable in timed sequence with the deformation of the roll 2 by the pressure members or anvils 124, 126, by retractor means connected to rod 133; in an alternative embodiment, rod 133 is encircled by a coil spring which normally holds the location pins in the position shown, but which can be compressed by the deforming roll. The retractor pins can if desired project through other holes in table 131 (not shown) to offset the roll from the anvils to obtain a T-section separator with an offset (first part) stem relative to the (second part) head.

Figure 8:
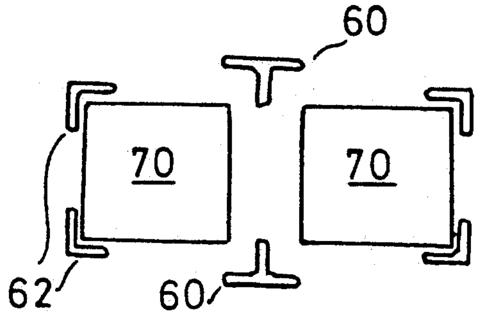
FIG. 8 is an exploded view of separators in use.

In the partial exploded view of FIG. 8, in a package a pair of separators 60 according to the invention are in use to help protect two audio-speakers 70 during transit, assisted at the corners by four conventional separators 62.

We have thus disclosed a novel form of separator and method of separator manufacture and manufacturing machine embodiments, which we believe will satisfy long-felt needs, and are solutions to packaging problems which have not so far as we are aware been previously addressed by those in the packaging industry. The T-section separator offers particular utility to manufacturers wishing to package matched products in a cushioning protective material adapted to be both load bearing and multi-impact absorbing, but is not limited to such use.

Whilst a suitable adhesive adapted for cold curing has been suggested for retaining the formed separator in the required T-section configuration, such adhesives being known to those in the art, alternative or additional retaining methods can be used, including hot-setting adhesives or bendable, rigid plates extending along a length of separator.

I claim:

1. The method of manufacturing a separator from single face corrugated paper comprising the steps of painting with an adhesive the exposed edges of the corrugations of said paper, wrapping said paper upon itself to form a roll of predetermined axial length with the corrugation edges facing radially inwardly of said roll, squeezing a first portion of said roll to a flattened condition between a first pair of jaws, squeezing between other jaws the remainder of the roll to a flattened condition which is perpendicularly disposed with respect to said first portion and projecting to either side beyond said first portion, and holding said roll squeezed between said jaws until said adhesive sets.

2. A method of manufacturing a separator according to claim 1 which includes the additional step of cutting a formed length of separator into a plurality of shorter lengths.

3. A machine for manufacturing a separator from a single face corrugated paper of which the exposed edges of the corrugations have been painted with adhesive and said paper wrapped upon itself to form a roll of predetermined axial length with the corrugation edges facing radially inwardly of said roll, said machine comprising means for positioning said roll in a predetermined location on said machine, first clamping means including a first pair of jaws for squeezing a first portion of said roll to a flattened condition, second clamping means including other jaws for squeezing a second remaining portion of the roll to a flattened condition which is perpendicularly disposed with respect to said first portion and projecting to either side beyond said first portion, and means for withdrawing said clamping means after a predetermined interval during which said adhesive sets and said first and second portions adopt a stable configuration to permit release of a formed separator from said machine.

* * * * *

UNITED STATES PATENT AND TRADEMARK OFFICE

CERTIFICATE OF CORRECTION

PATENT NO. : 5,275,677

DATED : January 4, 1994

INVENTOR(S) : Timothy C. Morley

It is certified that error appears in the above-indentified patent and that said Letters Patent is hereby corrected as shown below:

On the Title page, item [30], Foreign Application Priority Data insert--Jul. 21, 1990 [GB] United Kingdom......9016074.8--.

Signed and Sealed this

Seventh Day of June, 1994

Attest:

BRUCE LEHMAN

*Attesting Officer* *Commissioner of Patents and Trademarks*